United States Patent
Satpathy et al.

(10) Patent No.: US 10,190,236 B2
(45) Date of Patent: Jan. 29, 2019

(54) HIGH STRENGTH AND HIGH MODULUS ULTRA-HIGH MOLECULAR WEIGHT POLYETHYLENE FIBERS

(71) Applicant: RELIANCE INDUSTRIES LIMITED, Mumbai (IN)

(72) Inventors: Uma Sankar Satpathy, Vadodara (IN); Satya Srinivasa Rao Gandham, Vadodara (IN); Ajit Behari Mathur, Vadodara (IN); Raksh Vir Jasra, Vadodara (IN); Krishna Renganath Sarma, Vadodara (IN); Amit Kumar Punamchand Shah, Vadodara (IN); Yogini Maheshbhai Amin, Vadodara (IN); Gaurang Manilal Mehta, Vadodara (IN); Nanubhai Fuljibhai Patel, Vadodara (IN); Viralkumar Patel, Gujarat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 141 days.

(21) Appl. No.: 15/119,308

(22) PCT Filed: Feb. 17, 2015

(86) PCT No.: PCT/IB2015/051150
§ 371 (c)(1),
(2) Date: Aug. 16, 2016

(87) PCT Pub. No.: WO2015/125064
PCT Pub. Date: Aug. 27, 2015

(65) Prior Publication Data
US 2017/0009382 A1    Jan. 12, 2017

(30) Foreign Application Priority Data
Feb. 20, 2014  (IN) .......................... 604/MUM/2014

(51) Int. Cl.
| | | |
|---|---|---|
| D01F 6/04 | (2006.01) |
| C08L 23/06 | (2006.01) |
| D01F 6/46 | (2006.01) |
| D01F 1/10 | (2006.01) |
| B29C 55/00 | (2006.01) |
| C08J 3/075 | (2006.01) |
| C08K 5/00 | (2006.01) |
| C08K 5/098 | (2006.01) |
| C08K 9/04 | (2006.01) |
| D01D 5/088 | (2006.01) |
| D01D 10/06 | (2006.01) |
| B29K 23/00 | (2006.01) |
| B29K 105/00 | (2006.01) |
| B29L 31/00 | (2006.01) |

(52) U.S. Cl.
CPC ............. *D01F 6/04* (2013.01); *B29C 55/005* (2013.01); *C08J 3/075* (2013.01); *C08K 5/005* (2013.01); *C08K 5/0083* (2013.01); *C08K 5/098* (2013.01); *C08K 9/04* (2013.01); *C08L 23/06* (2013.01); *D01D 5/0885* (2013.01); *D01D 10/06* (2013.01); *D01F 1/10* (2013.01); *D01F 6/46* (2013.01); *B29K 2023/0683* (2013.01); *B29K 2105/0005* (2013.01); *B29L 2031/731* (2013.01); *C08J 2323/06* (2013.01); *C08L 2203/12* (2013.01); *C08L 2205/025* (2013.01); *C08L 2207/068* (2013.01)

(58) Field of Classification Search
CPC .......... B29C 2023/0683; C08J 2323/06; C08L 2207/068
See application file for complete search history.

(56) References Cited

U.S. PATENT DOCUMENTS

| | | |
|---|---|---|
| 5,342,567 A | 8/1994 | Chen et al. |
| 7,147,207 B2 | 12/2006 | Jordan et al. |
| 7,147,807 B2 | 12/2006 | Kavesh |
| 7,799,258 B2 | 9/2010 | Rastogi et al. |
| 2005/0121825 A1 | 6/2005 | Rastogi et al. |
| 2010/0286728 A1 | 11/2010 | Simmelink et al. |
| 2011/0082262 A1 | 4/2011 | Yeh et al. |

FOREIGN PATENT DOCUMENTS

| | | |
|---|---|---|
| EP | 1441886 A1 | 8/2004 |
| WO | WO-2008/141405 A2 | 11/2008 |
| WO | WO-2013/126268 A1 | 8/2013 |

OTHER PUBLICATIONS

International Search Report and Written Opinion of the ISA for PCT/IB2015/015510, ISA.
"Millad 3988 clarifies polypropylene for increased consumer appeal", Applications News, Plastics Additives & Compounding, Dec. 2000.
International Search Report and Written Opinion of the ISA for PCT/IB2015/051150.

*Primary Examiner* — James Sanders
(74) *Attorney, Agent, or Firm* — Harness, Dickey & Pierce, P.L.C.

(57) ABSTRACT

The present disclosure relates to a compact polymer gel consisting of disentangled ultrahigh molecular weight polyethylene (dis-UHMWPE), at least one nucleator, at least one filler and at least one fluid medium. The present disclosure also provides a process for the preparation of the compact polymeric gel and fibers from the compact polymeric gel of both low and high denier values. The fibers prepared in accordance with the present process have tensile strength ranging from 2.5 to 13 GPa, tensile modulus ranging from 100 to 270 GPa.

18 Claims, No Drawings

HIGH STRENGTH AND HIGH MODULUS ULTRA-HIGH MOLECULAR WEIGHT POLYETHYLENE FIBERS

CROSS-REFERENCE TO RELATED APPLICATIONS

This application is a 371 U.S. National Stage of International Application No. PCT/IB2015/051150, filed Feb. 17, 2015. This application claims the benefit of and priority to Indian Patent Application No. 604/MUM/2014, filed Feb. 20, 2014. The entire disclosures of the above applications are incorporated herein by reference.

FIELD

The present disclosure relates to high strength and high modulus ultra-high molecular weight polyethylene fibers and their process of preparation.

Definition

As used in the present disclosure, the following word/s and phrase/s are generally intended to have the meaning as set forth below, except to the extent that the context in which they are used to indicate otherwise.

The expression 'fiber' for the purpose of the present disclosure is a continuous elongated element, wherein the length dimension is much greater than the transverse dimensions of width and thickness. Accordingly, the expression fiber includes filament, ribbon, strip, yarn and the like having regular or irregular cross-section.

The term 'compact' for the purpose of the present disclosure, is used to describe a polymeric gel of the present disclosure having properties that favor optimum morphology and rheology leading to ease of spinning.

The term 'disentangled' is used to describe ultrahigh molecular weight polyethylene—homo-polymer(s) or copolymer(s) of ethylene having molar mass in the range of 0.3 million to 20 million; crystallinity greater than 75%; heat of fusion greater than 200 J/g and bulk density ranging from 0.048 to 0.3 g/cc, wherein the polyethylene chains have low entanglement or are completely disentangled.

BACKGROUND

High strength, high modulus polyethylene fibers have been prepared from ultrahigh molecular weight polymers by solution spinning and drawing. Such filaments have proven extremely useful for cut-resistant applications, composites, ropes and netting. Conventionally, polymeric solutions have been subjected to spinning to obtain strong polyethylene fibers.

With the advancement of technology, two solution spinning processes were developed. In one solution spinning process, a solution of ultrahigh molecular weight polyethylene (UHMWPE) is prepared at an elevated temperature in a first solvent such as a heavy mineral oil that is essentially non-volatile. This polymer solution is spun and quenched to a gel state essentially without evaporation of the solvent. The solvent is removed from the gel filaments by extraction using another solvent having a boiling point lower than 100° C. The gel filaments containing the second solvent are dried to form xerogel filaments (filaments formed by drying with unhindered shrinkage). Multi-stretching of gel filaments is carried out at three stages: (i) before the extraction of the first solvent, (ii) before evaporating the second solvent and (iii) after drying the filament.

According to a second solution spinning process, a solution of ultrahigh molecular weight polyethylene (UHMWPE) is prepared in a solvent that is volatile. The UHMWPE solution is spun at an elevated temperature, cooled to form gel filaments where the volatile solvent is evaporated and then the filaments are stretched. U.S. Pat. No. 7,147,807 discloses a process for spinning high molecular weight poly (alpha-olefin) (UHMWPO) filament from solution in a volatile solvent with recovery and recycling of the solvent. However, the UHMWPE filament obtained by the process disclosed in U.S. Pat. No. 7,147,207 suffers from drawbacks such as unacceptable crimp, light transmittance, creep and heat resistance.

US Patent Publication No. 20110082262 mentions a composite material prepared by mixing an inorganic substance and an UHMWPE gel solution and processing the solution by a predetermined manufacture process. However, excessive use of inorganic substance cracks or breaks the fibers at an early stage of the process.

Attempts have also been made to prepare high strength and stiffness fibers by orienting the polymer chains in a parallel fashion along the fiber-axis. However, in high performance polyethylene fibers (HP-PE) orientation/extension of the individual molecule is very difficult as these polymer chains are highly flexible and get entangled within themselves and with each other. Furthermore, UHMWPE fibers have a tendency to creep, which makes them inefficient for utilization in long term applications.

In our co-pending application number 1801/MUM/2013, there is provided a process for the preparation of high strength and modulus fibers from a gel composite comprising entangled as well as disentangled UHMWPE. The tensile strength of the resulting fiber ranges from 2.5 to 10 GPa and the tensile modulus from 110 to 300 GPa as a virtue of the dominance of entangled UHMWPE.

In spite of the technological advancements, the conventional processes used for the preparation of fibers from UHMWPE are relatively expensive and produce fibers that have poor morphological and mechanical properties. A need is therefore felt for providing a process for the preparation of fibers having excellent mechanical properties and a gel for the preparation of the fibers.

Objects

Some of the objects of the present disclosure, of which at least one embodiment is adapted to provide, are described herein below:

It is an object of the present disclosure to provide a compact polymeric gel.

It is another object of the present disclosure to provide a process for the preparation of the compact polymeric gel.

It is still another object of the present disclosure to provide high strength and high modulus fibers from the compact polymeric gel.

It is yet another object of the present disclosure to provide a process for the preparation of high strength and high modulus fibers from the compact polymeric gel.

It is still another object of the present disclosure to provide a process for the preparation of very low denier (ultrafine denier filament) as well as high denier filaments having higher mechanical properties from the compact polymer gel of the present disclosure.

It is still another object of the present disclosure to ameliorate one or more problems of the prior art or to at least provide a useful alternative.

Other objects and advantages of the present disclosure will be more apparent from the following description, which is not intended to limit the scope of the present disclosure.

SUMMARY

The present disclosure provides a compact polymeric gel and its process of preparation.

Typically, the gel comprises:
i. disentangled ultrahigh molecular weight polyethylene (dis-UHMWPE) in an amount ranging from 2 to 40% with respect to the total mass of the gel;
ii. at least one nucleator in an amount ranging from 0.05 to 4.0% with respect to the total mass of the gel;
iii. at least one filler in an amount ranging from 0.1 to 1.5% with respect to the total mass of the gel; and
iv. at least one fluid medium.

The present disclosure further provides a process for the preparation of high strength and high modulus fibers from the compact Dis-UHMWPE gel. Typically, the tensile strength of the fibers ranges from 2.5 to 13 GPa, tensile modulus ranges from 100 to 270 GPa, a first denier value ranging from 0.50 to 10.0 d and a second denier value ranging from 3 to 80 d.

DETAILED DESCRIPTION

In the gel spinning technique, the polymer molecules are dissolved in a solvent and spun through a spinneret. In the solution, the molecules become disentangled and remain so even after the solution is spun to form filaments. Because of low degree of entanglement, the gel spun material can be drawn to fibers to a very high extent. As the fiber is super drawn, a very high level of macromolecular orientation is attained. To reach a high draw ratio in the fiber, the UHMWPE polymer chains must have a low entanglement density to allow for polymer chain orientation during drawing.

Therefore, in the present process, dis-UHMWPE has been used as a precursor to prepare a gel, so that the disentangled UHMWPE chains are dissolved readily to achieve maximum disentanglement; thereby achieving micro structural and morphological perfection to produce ultrafine denier filaments with superior mechanical properties. Furthermore, the process of the present disclosure offers advantages of both the gel spinning and the melt spinning.

In accordance with one aspect of the present disclosure, there is provided a compact polymeric gel that contains dis-UHMWPE, at least one nucleator, at least one filler and at least one fluid medium. The gel may also contain entangled UHMWPE (ent-UHMWPE), in an amount less than that of dis-UHMWPE. The total UHMWPE used in making the compact polymeric gel is present in an amount ranging from 2.0 to 40.0% with respect to the total mass of the gel. The polymer concentration in the gel is found to play a very important role. Typically, the molecular weight of the dis-UHMWPE as well as the ent-UHMWPE is 0.3 million or more. Use of dis-UHMWPE in the composition imparts high tenacity to the fiber. At least one nucleator is present in an amount ranging from 0.05 to 4.0% with respect to the total mass of the gel and is selected from the group consisting of di(3,4-dimethylbenzylidene)sorbitol (Millad 3988), 2,2'-Methylene-bis-(4,6-di-tert-butylphenyl)phosphate Sodium salt (NA11) and aluminum hydroxy bis(2,2'-methylenebis[4,6-di(tert-butyl)phenyl]phosphate (NA21).

The filler is included in an amount ranging from 0.1 to 1.5% with respect to the total mass of the gel and is at least one selected for the group consisting of montmorillonite modified with a quaternary ammonium salt (Closite15A) and calcium stearate. Fillers are added to improve creep resistant properties and thermal stability of the resulting fiber. The improvement in creep properties may be due to strain hardening and crosslinking behavior, whereas thermal stability is attributed to the dispersion of filler platelet on to polymeric network showing nano composite characteristics. The fillers in combination with nucleators expedite the process of gelation and crystallization, which ultimately facilitates the disentangling and compaction process effectively and efficiently leading to the formation of ultra-high strength and high modulus fibers.

The fluid medium used in the gel is present in an amount sufficient enough to impart gel-like nature to the polymeric mixture and is at least one selected for the group consisting of aliphatic hydrocarbons, acyclic hydrocarbons, cyclic hydrocarbons, aromatics hydrocarbons and halogenated hydrocarbons. Though any fluid medium can be used a fluid medium having boiling point greater than 180° C. is particularly used. Typically, the fluid medium is at least one selected for the group consisting of decalin, mineral oil, cis-decahydronaphthalene, trans-decahydronaphthalene and dichlorobenzene. In one embodiment, the mineral oil is paraffin oil.

The polymeric gel of the present disclosure further includes at least one antioxidant in an amount ranging from 0.25 to 5.0% with respect to the total mass of the gel. The antioxidant prevents thermal degradation of the gel during extrusion, which is carried out at an elevated temperature. Typically, the antioxidant is at least one selected for the group consisting of tris(2,4-ditert-butylphenyl) phosphite and pentaerythritol Tetrakis(3-(3,5-di-tert-butyl-4-hydroxyphenyl) propionate). In one embodiment, a combination of two antioxidants is used wherein the ratio of first antioxidant to the second antioxidant ranges from 1:1 to 1:2. The polymeric gel may also contain at least one modifier in an amount ranging from 0.25 to 1.5% with respect to the total mass of the gel. In one embodiment, the modifier is calcium stearate. The modifier used in the polymeric gel contributes in improving the process by modifying the ability and mobility of the macromolecular chain of UHMWPE.

In accordance with another aspect of the present disclosure, there is provided a process for the preparation of the compact polymeric gel. The process initially includes admixing UHMWPE in an amount ranging from 2.0 to 40.0% with respect to the total mass of the gel, at least one nucleator in an amount ranging from 0.05 to 4.0% with respect to the total mass of the gel, at least one filler in an amount ranging from 0.1 to 1.5% with respect to the total mass of the gel, optionally at least one antioxidant in an amount ranging from 0.25 to 5.0% with respect to the total mass of the gel and optionally, at least one modifier in an amount ranging from 0.25 to 1.5% with respect to the total mass of the gel to obtain a first admixture. UHMWPE in one embodiment is dis-UHMWPE. UHMWPE in another embodiment is ent-UHMWPE in combination with dis-UHMWPE such that it is present in an amount less than that of dis-UHMWPE. Next, the first admixture is incorporated in the fluid medium to obtain a second admixture, which is heated at a temperature ranging from 50 to 200° C. for a time period ranging from 2 to 20 hours under inert conditions to obtain a compact polymeric gel composition. The temperature-time protocol plays a crucial role in optimizing the rheological characteristics of the compact polymeric gel.

Further, the dissolution time period may vary depending on the molecular weight of the polymer. Temperature-time distribution can be maintained either in single spell or in two spell for making the gel. The spells are decided based on the range of the molecular weight of the polymer being used for preparing the gel.

The composition is cooled to obtain a cooled polymeric gel composition; which after removing the excess of the fluid medium, results in the compact polymeric gel. Then the mixture is cooled to attain a compact gel state having a sufficient level of molecular disentanglement, making it suitable for fiber spinning. The excess fluid medium is removed from the gel to adjust the concentration of polymer in the gel. The removed excess fluid medium may further be recycled and reused in the same or different processes. This method step of filter press before spinning indeed makes the process economic and safe. The compact polymeric gel obtained after removing fluid medium may be stored up to six months or may be used immediately for extrusion/fiber spinning. The shelf life of the gel is quite long and the gel also retains its spinability, which becomes an added advantage of the present process.

In accordance with yet another aspect of the present disclosure there is provided a process for the preparation of fibers from the compact polymeric gel of the present disclosure. Typically, the fibers have tensile strength ranging from 2.5 to 13 GPa, tensile modulus ranging from 100 to 270 GPa, a first denier value ranging from 0.50 to 10.0 d and a second denier value ranging from 3 to 80 d. As mentioned earlier in the specification, a first denier value is used to indicate low denier value and a second denier value is used to indicate a high denier value.

Significantly, the present process can be manipulated to accommodate preparation of both very low denier as well as high denier fibers by varying the stretching parameters such as stretching ratio and the spinning parameters. Fibers having a high denier value are typically used for applications such as manufacturing of ropes whereas fibers having low denier values are used for biomedical applications. Typically, the first denier value ranges from 0.50 to 1.5 d and the second denier value ranges from 3 to 30 d.

The process is initiated by spinning the compact polymeric gel at a temperature ranging from 120 to 200° C., at a pressure ranging from 2 to 3 kg/cm$^2$ to obtain spun fibers. The step of spinning is carried out either by using a spinning unit or by a single screw extruder. The spun fibers are extruded at different temperature profiles to obtain uniform denier fibers. In a continuous mode, the compact gel is extruded on an extruder to produce multi fiber tow under optimum temperature profile selected from the group consisting of 220° C.-230° C.-250° C., 195° C.-200° C.-210° C., 175° C.-185° C.-190° C. and 145° C.-155° C.-160° C. for making uniform denier fiber. However, the temperature profile used in both modes is lower compared conventional gel spinning process. This improvement is due to significant reduction in macromolecular chain entanglement and maximization of chain extension leading to micro structural and morphological perfection to the spun filament to eventually produce high performance filament through ultra-hot stretching. The rate of extrusion of fibers is optimized depending on the number of fibers required for further process.

The uniform denier fibers are then quenched in at least one quenching medium at a temperature ranging from 5° C. to 30° C. to obtain quenched fibers. This temperature range was found to be very sensitive to regulate amorphosity and crystallinity of fiber so that the kind of microstructure produced in turn produces ultra-high tenacity upon multi-stage hot stretching. The quenching medium of the present disclosure, in one embodiment, is water. The quenched fibers are further washed with water or acetone or hexane. In an exemplary embodiment, the gel fiber is passed through a water bath kept at a temperature of 25° C. to remove the solvent and then passed through an acetone bath primarily to remove maximum amount of solvent from the fiber.

The quenched and/or washed fibers are then dried at a temperature ranging from 80° C. to 125° C. to obtain dried fibers following which they are hot stretched at a temperature ranging from 90° C. to 140° C. at a draw ratio of 5 to 10 to obtain the hot stretched fibers or simply fibers of the present disclosure. In one embodiment, the step of hot stretching is multi-stage hot stretching.

In one embodiment of the present disclosure, the fiber after extrusion is allowed to undergo aerial stretching by adjusting the distance between the spinnerets and the quench bath so that such pre-stretched filaments when quenched evenly, distribute the amorphosity and crystallinity of the gel fiber.

In accordance with the present disclosure, the use of compact gel provides effective control over morphology and microstructure of spun fiber through spinning which essentially facilitates to minimize fiber defects as well as solvent retention to a greater extent. More importantly, when such spun fiber of the present disclosure is subjected to hot stretching it promotes ultra-drawing to produce ultra-high tenacity and ultra-high modulus fibers even at lower overall total draw ratio. In one embodiment of the present disclosure high tensile strength and tensile modulus, properties are achieved at a very lower draw ratio, typically below 10.

It is significant to note that the gelation mechanisms of UHMWPE chain differ significantly in decalin and paraffin although these are the typical solvents used to gel spin UHMWPE fibers with high strengths and high modulus. In both the solvents, gelation is attributed to liquid-liquid phase separation driven by concentration fluctuations during the initial stage. The gelation speeds and temperatures differ significantly in the two solvents. Particularly, in decalin, the solvent flows from the gels and syneresis occurs during crystallization; thereby making it easier to adjust the polymer concentration at higher side by removing the solvent prior to spinning. Moreover, the gelation of UHMWPE in decalin is generated in the polymer-rich phase (the heterogeneous network system) during the phase separation and the phase separation plays a driving force to cause gelation/crystallization under an optimum temperature and time during the dissolution process of the polymer. Also, in the current process, presence of optimum doses of nucleator and filler further promotes the cooperative events of gelation and crystallization of the polymeric chain, which eventually governs the aggregation/compaction of the macromolecular disentangled chains under heating and cooling process through optimum temperature and time management finally to obtain the compact gel at an ambient temperature. Gel syneresis plays an important role of removing decalin from the gels; thereby facilitating control over the morphology and rheology of the spinable gel.

In yet another aspect of the present disclosure, the fibers obtained in accordance with the present disclosure are useful in cut-resistant, composites, ropes and netting applications.

The present disclosure will now be discussed in the light of the following non-limiting embodiments:

Example 1: Process for the Preparation of Fibers According to the Present Disclosure (Dis-UHMWPE Only)

A compact gel of dis-Ultrahigh molecular weight polyethylene (UHMWPE) having molecular weight 2.7 million was premixed with an antioxidant and other additives as presented herein below in decaline different concentrations ranging from 4 to 8 wt % using one liter capacity Par reactor at normal pressure under nitrogen blanket where a temperature of 150° C. was critically maintained under stirring at a speed of 50 to 80 rpm for a total time period of 2 hrs. The compact gel so prepared was extruded at 150° C. through a spinneret of diameter 0.5 mm under nitrogen pressure of 2-3 kg. The obtained mono filament was quenched in water bath, often called as quench bath at a set of 5 to 10° C. After cooling in the water bath, a gelatinous filament was passed through the wash bath followed by acetone bath at 25° C. and subsequently dried on line. The dried fibers were wound at a winding speed of 25 m/min Thus, the monofilament with uniform denier was finally collected on a spool. This filament is comprised a physical network of polyethylene chains and was sufficiently strong to be transported to an oven for drawing and solvent removal. The filaments produced from the gel of different concentrations were finally subjected to a single step hot stretching at 140° C. in the tensile mode, which showed that both the tensile strength (TS) and tensile modulus (TM) increases with an increase of polymer concentration in the gel as summarized in Table 1.

TABLE 1

Influence of polymer concentration in gel on the mechanical properties of the filament after hot stretching.

| Batch No. | Polymer Concentration (Wt %) | Tensile Modulus (GPa) | Tensile Strength (GPa) | % Elongation | Total draw ratio (TDR) |
|---|---|---|---|---|---|
| 1 | 4 | 140 | 3.5 | 4.5 | 5 |
| 2 | 6 | 180 | 7.5 | 3.5 | 5 |
| 3 | 8 | 250 | 10.50 | 2.5 | 5 |

Where:

Molecular weight (MW) of dis-UHMWPE: 2.7 M,

Poly Concentration: Varied wt %,

Nucleator: 0.15 wt %;

Closite15A:0.05 wt %;

Irgafos168: 0.25 wt %;

Irganox1010:0.18 wt %, and

Cast: 0.50 wt %

Example 2: Process for the Preparation of Fibers According to the Present Disclosure (dis-UHMWPE+ent-UHMWPE)

A gel comprising dis-UHMWPE (MW: 2.7 M) and Ent-UHMWPE (MW: 5M) from nil to 50 wt % was prepared keeping other process variables the same as in Example 1. Also, spinning was carried out in the same manner as described in Example 1, except the concentration of the polymer in polymeric gel for each composition was maintained 9 wt % throughout the processing of gel.

Spun filaments were prepared separately under similar experimental conditions and were characterized for tensile strength (TS), tensile modulus (TM) and Denier (d) respectively. After that these filaments were further hot stretched at 135° C. at single step having total draw ratio 6 and the results were summarized in Table 2. It was found that the mechanical properties (TS and TM) and denier of the hot stretched filament changed significantly as shown in Table 2. It was found that the current process is quite effective in producing ultrafine denier filament having very superior mechanical properties.

TABLE 2

Effect of feed composition on mechanical properties and denier of the filament before (A) and after (B) hot stretching.

| Batch No. | Matrix type | Feed composition (wt %) | Tensile Strength (GPa) | | Tensile Modulus (GPa) | | Denier (d) | |
|---|---|---|---|---|---|---|---|---|
| | | | A | B | A | B | A | B |
| 1 | Neat-entangled | 100 | 0.49 | 6.58 | 8.65 | 181.6 | 62.25 | 39.25 |
| 2 | Combination | 90:10 | 0.64 | 12.55 | 0.75 | 262 | 55.55 | 28.35 |
| 3 | Combination | 80:20 | 1.11 | 10.84 | 1.85 | 185 | 31.11 | 17.50 |
| 4 | Combination | 60:40 | 1.20 | 10.23 | 1.91 | 173 | 20.15 | 10.67 |
| 5 | Combination | 50:50 | 1.23 | 9.89 | 1.98 | 172 | 14.75 | 8.35 |
| 6 | Neat-disentangled | 100 | 1.48 | 12.15 | 2.26 | 145 | 7.25 | 3.16 |

Example 3: Process with Different Winding Speeds

Gels of 5% concentration each of Dis-UHMWPE resin (MW: 2.7M) and Ent-UHMWPE (MW: 6M) were prepared under the process conditions as described in Example 1 and 2, respectively. Here, the nucleator concentration was maintained at 0.10% the total mass of gel. The gels were spun into filaments separately and collected on a spool at different winding speed. It was found that a change of denier with increasing winding speed was influenced by the type of resin used for making the gel. In fact, the denier reduction was more pronounced with the disentangled series as compared to Ent-UHMWPE series, which showed that draw ability is faster for neat Dis-UHMWPE as compared to Ent-UHMWPE macromolecular chain (Table 3).

TABLE 3

Comparison of denier change of spun Ent-UHMWPE and Dis-UHMWPE filament at different winding speeds

| Batch No. | Winding Speed m/min | Dis-UHMWPE Filament Denier (d) | Ent-UHMWPE Filament Denier (d) |
|---|---|---|---|
| 1 | 10 | 7.25 | 62 |
| 2 | 15 | 5.50 | 40 |
| 3 | 20 | 2.50 | 30 |
| 4 | 25 | 1.45 | 28 |

Example 4: Process with Different Gelation Times and Extrusion Temperatures

A gel of 5% concentration of dis-UHMWPE (MW: 3M) was prepared as per Example 1 at 150° C. with a gelation time 2 hrs; whereas a gel of 5% concentration gel of ent-UHMWPE was prepared at 170° C. with a gelation time 4 hrs. However, both the gels were prepared under the same agitation speed of 70 rpm. After that the gels were spun into filaments under typical spinning conditions as summarized in Table 4. The ent-UHMWPE gel required higher extrusion temperature (170° C.) as compared to the dis-UHMWPE as shown in Table 4. The spun filaments were subjected to single step hot stretching with a total draw ratio of 7. Both the filaments were characterized for mechanical properties and denier. Filaments obtained from dis-UHMWPE gel showed higher tenacity and lower denier as compared to the filaments produced from ent-UHMWPE gel. The results indicate that dis-UHMWPE exhibits higher draw ability and a higher degree of macromolecular orientation as compared to ent-UHMWPE filament. Besides, dis-UHMWPE gel can be spun into filaments at a lower extrusion temperature as compared to the normal UHMWPE gel.

TABLE 4

Spinning history and fiber properties: Entangled-UHMWPE (3M) and Dis-UHMWPE (3M) gels

| Batch No. | Polymer, (Wt %) | QB Temperature (° C.) | Extrusion Temperature (° C.) | WS (m/min) | TS (GPa) | TM (GPa) | Denier (d) |
|---|---|---|---|---|---|---|---|
| 1 | 5 (Ent-UHMWPE) | 5 | 170 | 10 | 4.50 | 180 | 31 |
| 2 | 5 (Dis-UHMWPE) | 5 | 150 | 10 | 6.85 | 165 | 2.5 |

Where:
QB Temperature: Quench Bath Temperature;
WS: Winding Speed;
TS: Tensile strength;
TM: Tensile Modulus.

Example 5: Process with Different Molecular Weights

Dis-UHMWPE resin having different molecular weights (MWs) ranging from 1.9 to 6M was used for making gel as per the conditions and procedure described in Example 1. The gels were processed and the solvent(s) was removed so that the concentration of the resin having different molecular weights in the polymeric gel was maintained at 5.5 wt %, which was separately spun into filaments as per the spinning history summarized in Table 5. The spun filament obtained from different MWs was further hot stretched with an overall draw ratio of 5 and the mechanical properties were evaluated. The results are summarized in Table 5. It was found that both the tensile strength and tensile modulus showed an increasing trend with an increasing molecular weight of Dis-UHMWPE resin as shown in Table 5.

TABLE 5

Effect of different MWs of Dis-UHMWPE on the mechanical properties under optimum spinning conditions

| Batch No. | Mw; Dis-UHMWPE | QB Temperature (° C.) | Extrusion Temperature (° C.) | WS (m/min) | TS (GPa) | TM (GPa) | Elongation (%) |
|---|---|---|---|---|---|---|---|
| 1 | 1.9 | 10 | 150 | 15 | 2.70 | 135 | 4.15 |
| 2 | 2.7 | 10 | 150 | 15 | 4.25 | 165 | 3.5 |
| 3 | 6.0 | 10 | 150 | 15 | 6.50 | 220 | 2.75 |

Where:
QB Temperature: Quench Bath Temperature;
WS: Winding Speed;
TS: Tensile strength;
TM: Tensile Modulus.

Example 6: Process with Different Quenching Bath Temperatures

Dis-UHMWPE (MW: 2.7M) was used to prepare a gel of 9 wt % in decalin as described in Example 1. The process conditions for making the gel were the same as in Example 1 and Example 2 respectively. The gel was spun into filaments under different quench bath (QB) temperatures ranging from 5 to 25° C. with 20 mm air gap between the Spinnerette and the quench bath. The filaments prepared from these experiments were further hot stretched and characterized for their mechanical properties. It was found that the mechanical properties were influenced by the quench bath temperature as shown in Table 6.

TABLE 6

Effect of quench bath temperature on mechanical properties of the hot stretched filament

| Batch No. | QB Temperature (° C.) | WWB Temperature (° C.) | Extrusion Temperature (° C.) | WS (m/min) | TS (GPa) | TM (GPa) | TDR |
|---|---|---|---|---|---|---|---|
| 1 | 5 | 10 | 150 | 20 | 7.45 | 187 | 7 |
| 2 | 10 | 10 | 150 | 20 | 5.25 | 170 | 7 |
| 3 | 20 | 10 | 150 | 20 | 4.50 | 165 | 7 |
| 4 | 25 | 10 | 150 | 20 | 3.5 | 155 | 7 |

Where:
QB Temperature: Quench Bath Temperature;
WWB: Water wash bath;
WS: Winding Speed;
TS: Tensile strength;
TM: Tensile Modulus;
TDR: Total draw ratio;
MW of Dis-UHMWPE: 2.7 M;
Nucleator: 0.15 wt %;
Closite15A: 0.05 wt %;
Irgafos168: 0.25 wt %;
Irganox1010: 0.18 wt %; and
Cast: 0.50 wt %

Example 7: Process with Entangled and Disentangled UHMWPE in Different Proportions Gels of neat dis-UHMWPE (MW: 6M) and neat ent-UHMWPE (MW: 8 M) were prepared with a concentration of 6 wt % in decalin as described in Example 1 and Example 2. Next a mixed gel of the dis-UHMWPE and 5% normal UHMWPE having MW: 8M with a feed composition 95:5 wt % (dis-UHMWPE and ent-UHMWPE) was prepared. Further, a gel was prepared using a reverse composition of ent-UHMWPE and dis-UHMWPE by feed composition 95:5 wt %. However, the process conditions for making the gels were same as in Example 1. These three gels were spun into filaments and the mechanical properties of the filaments were evaluated after hot stretching on the tensile mode. Results were summarized in Table 7. It was observed that the inclusion of lower percentage (5 wt %) of either ent-UHMWPE or dis-UHMWPE influences the mechanical properties as described in Table 7.

TABLE 7

Effect of feed composition of gel on mechanical properties of the fiber after hot stretching

| Batch No. | Dis-UHMWPE/ Ent-UHMWPE | WWB Temperature (° C.) | Extrusion Temperature (° C.) | WS (m/min) | TS (GPa) | TM (GPa) | TDR |
|---|---|---|---|---|---|---|---|
| 1 | 100:0 | 8 | 150 | 10 | 6.25 | 167 | 5 |
| 2 | 95:5 | 8 | 150 | 10 | 5.15 | 185 | 5 |
| 3 | 5:95 | 8 | 150 | 10 | 7.25 | 225 | 5 |
| 4 | 0:100 | 8 | 150 | 20 | 5.75 | 189 | 5 |

Where:
QB Temperature: Quench Bath Temperature;
WWB: Water wash bath;
WS: Winding Speed;
TS: Tensile strength;
TM: Tensile Modulus;
TDR: Total draw ratio;
MW of Dis-UHMWPE: 2.7 M;
Nucleator: 0.15 wt %;
Closite15A: 0.05 wt %;
Irgafos168: 0.25 wt %;
Irganox1010: 0.18 wt %; and
Cast: 0.50 wt %

Example 8: Process with Different Hot Stretching Temperature

Spun filaments were prepared from a mixed gel of dis-UHMWPE and ent-UHMWPE having composition 90:10 wt % with the other conditions same as described in Example 2 (Table 2). This filament was hot stretched under different temperatures ranging from 120 to 140° C. These samples were then characterized for their mechanical properties and the results were summarized in Table 8. It was found that both the tensile strength and tensile modulus showed an increasing trend with an increase in the stretching temperature. Also, there was a significant enhancement in the mechanical properties when the spun filament was subjected to a single step hot stretching as shown in Table 8 at a draw ratio of 6.

TABLE 8

Influence of hot stretching temperature on mechanical properties

| Batch No. | Hot stretched Temperature, ° C. | TS (GPa) | TM (GPa) | % Elongation |
|---|---|---|---|---|
| 1 | Not hot stretched | 0.64 | 0.75 | 20 |
| 2 | 120 | 1.85 | 102 | 14 |
| 3 | 130 | 2.65 | 186 | 2.91 |
| 4 | 140 | 12.50 | 282 | 2.6 |

Where:
TS: Tensile strength; and
TM: Tensile Modulus.

Example 9: Process with Spin Gap Variation

A mixed gel of dis-UHMWPE and ent-UHMWPE having composition 90:10 (wt %) was used to prepare a spun filaments in the same manner as described in Example 2 and Table 2 except the spin gap variation. The filaments of the present example were prepared at different spin gaps between the Spinnerette and the quench bath, which were in the range of 10 mm to 30 mm as described in Table 9.

However, the filaments prepared under different spin gaps were hot stretched at 140° C. and stretched at a draw ratio 7. The mechanical properties were influenced by the spin gap maintained between the Spinnerette and the quench bath. More importantly, it was found that to obtain the most uniform yarn with the highest tensile properties, it is essential that the spin gap be constant and that the perturbation of the surface of the quench bath be minimal.

TABLE 9

Influence of spin gap between spinneret and the quench bath on the mechanical properties of the filament after hot stretching

| Batch No. | Gap between spinneret and quench bath (mm) | TS (GPa) | TM (GPa) | TDR |
|---|---|---|---|---|
| 1 | 10 | 2.25 | 125 | 7 |
| 2 | 15 | 6.5 | 140 | 7 |
| 3 | 20 | 12.65 | 262 | 7 |
| 4 | 30 | 7.24 | 180 | 7 |

Where:
TS: Tensile strength;
TM: Tensile Modulus; and
TDR: Total draw ratio;

Example 10: Process with Different Extrusion Temperatures and Spin Modes

4% UHMWPE gel (MW: 8 M) was spun into filaments in the same manner as described in Example 1, both in batch and continuous mode. The spinning conditions along with the mechanical properties of the fiber obtained after hot stretching are summarized in Table 10. In both the modes, the results obtained were reproducible.

TABLE 10

Spinning history and mechanical properties of hot stretched fiber

| Batch No. | QB Temperature (° C.) | Extrusion Temperature (° C.) | WS (m/min) | Spin mode | TS (GPa) | TM (GPa) | TDR |
|---|---|---|---|---|---|---|---|
| 1 | 7 | 165-170-175-178 | 25 | Continuous | 2.75 | 129 | 6 |
| 2 | 7 | 173 | 25 | Batch | 3.55 | 137 | 6 |

Where:
TS: Tensile strength;
TM: Tensile Modulus;
TDR: Total draw ratio;
MW of UHMWPE: 8M;
Poly Concentration: 4 wt %;
Nucleator: 0.15%;
Closite15A: 0.05%;
Cast: 0.3%;
Irganox1010: 0.25%;
Irgafos168: 0.3%;
Stretching Temp: 140° C.; and
Single step stretching Example 11: Process with Different Spinning Solvents A filament of 8 M-UHMWPE resin having 5% concentration was prepared under optimum spinning conditions using decalin, paraffin oil and mixed solvent (decalin and paraffin oil) in the same manner as described in Example 1, and the spinning history is described in Table 11. The spun filaments obtained after using different solvents was hot stretched separately and also characterized for their mechanical properties, which are summarized in Table 11. The results show that the mechanical properties are influenced by the type of the solvent system used during spinning

TABLE 11

Effect of solvent type on mechanical properties of fiber

| Batch No. | Spin solvent | QB Temperature (° C.) | Extrusion Temperature (° C.) | WS (m/min) | TS (GPa) | TM (GPa) | TDR |
|---|---|---|---|---|---|---|---|
| 1 | Decalin | 10 | 170 | 25 | 2.65 | 125 | 8 |
| 2 | Paraffin oil | 10 | 170 | 25 | 3.21 | 138 | 8 |
| 3 | Decalin + Paraffin oil (80/20) | 10 | 170 | 25 | 4.25 | 150 | 8 |

Where:
QB Temperature: Quench Bath Temperature;
WWB: Water wash bath;
WS: Winding Speed;
TS: Tensile strength;
TM: Tensile Modulus;
TDR: Total draw ratio;
MW of UHMWPE: 8M;
Poly Concentration: 5 wt %;
Nucleator: 0.15%;
Closite15A: 0.05%;
Cast: 0.3%;
Irganox1010: 0.25%;
Irgafos168: 0.3%;
Stretching Temp: 140° C.; and
Single step stretching Example 12: Mechanical Properties After Hot Stretching Dis-UHMWPE (MW: 5M) was used to prepare a 4 wt % gel in decalin under the process conditions as described in Example 1. This gel was then spun into filaments at a temperature of 165° C. by keeping the quench bath temperature at 5° C. and wash bath temperature at 27° C. respectively. The spinning steps involved in the preparation of the monofilament on a batch mode were same as described in Example 1. The spun filaments were collected on a spool with a winding speed of 25 meters/min. The spun filament was further subjected to hot stretching at 140° C. and a continuous length of hot stretched uniform and fine denier filaments was prepared having superior mechanical properties as shown in Table 12. It was observed that there was a significant enhancement in the mechanical properties as well as a reduction in denier after hot stretching when a total draw ratio (TDR) of 9.50 was maintained.

TABLE 12

Change in mechanical properties and denier of dis-UHMWPE fiber after hot stretching

| Batch No. | Type of sample | TS (GPa) | TM (GPa) | Denier (d) |
|---|---|---|---|---|
| 1 | Before hot stretching | 0.85 | 15.50 | 4.25 |
| 2 | After hot stretching | 5.65 | 195 | 0.52 |

Where:
TS: Tensile strength; and
TM: Tensile modulus

Example 13

A compact gel of neat dis-UHMWPE having MW: 5 M was prepared in decalin keeping all the process variables the same as in Example 1 except that the concentration of the polymer in the polymeric gel was maintained 4.5 wt %. Spun filaments were prepared under similar experimental conditions as described in Example 1 except the use of a spinneret having a higher diameter (0.8 mm) during spinning. The resultant filaments were further hot stretched at 145° C. at single step having total draw ratio of 6 and then characterized for tensile strength (TS), tensile modulus (TM) and Denier (d) respectively, the results being summarized in Table 13. It was found that the mechanical properties (TS and TM) and denier of the hot stretched filament changed significantly as shown in Table 13. Results have revealed that the present process is quite effective in producing higher denier filament as well having higher mechanical properties.

TABLE 13

Change in mechanical properties and denier after hot stretching of dis-UHMWPE fiber

| Batch No. | Type of sample | TS (GPa) | TM (GPa) | Denier (d) |
|---|---|---|---|---|
| 1 | Before hot stretching | 0.55 | 10.50 | 21.50 |
| 2 | After hot stretching | 4.65 | 179 | 9.25 |

Where:
TS: Tensile strength; and
TM: Tensile modulus

The embodiments herein, and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Technical Advantages And Economic Significance

- As the UHMWPE precursor is pre-disentangled, the process of making a gel at a lower temperature with less gelation time becomes easy as compared to a normal UHMWPE precursor; thereby maximizing the chain extension which is essential to regulate the morphology and microstructure of the spun filaments during spinning which ultimately facilitates maximum macromolecular orientation through hot stretching leading to desirable mechanical properties.
- The present process aids in achieving fine denier filaments even prior to the step of hot stretching.
- As the spinable compact gel comprises Dis-UHMWPE matrix, a large amount of solvent (>90%) coming out from the extruder during direct feeding of the polymer slurry is avoided; thereby making the process more safe, easy and economical in recycling/recovering solvent.
- Minimization of residual solvent on to the core structure of the fiber due to improved morphology and microstructure prompts the production of ultra-high strength and high modulus fibers.
- Superior mechanical properties are achieved at a lower total draw ratio (<10 DR) as compared to known process (>100 DR) for both spun and direct solid starched filament.
- The process of the present disclosure is favorable for high speed spinning.
- The process of the present disclosure provides refined microstructure and morphology to produce defect free fine denier fibers having superior mechanical properties and high degree orientation.
- The process of the present disclosure provides a gel that retains its spin ability characteristics for a longer time period (up to six months).
- The present process drives to improve the thermal stability as well as the creep properties.
- The present process is used for preparing fibers of both high and low denier values.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A compact polymeric gel comprising:
   i. ultrahigh molecular weight polyethylene (UHMWPE) in an amount ranging from 2 to 40% with respect to the total mass of the gel;
   ii. at least one nucleator in an amount ranging from 0.05 to 4.0% with respect to the total mass of the gel;
   iii. at least one filler in an amount ranging from 0.1 to 1.5% with respect to the total mass of the gel; and
   iv. at least one fluid medium;
   wherein said UHMWPE is disentangled-UHMWPE or is a combination of entangled-UHMWPE and disentangled-UHMWPE such that the amount of entangled-UHMWPE is equal to or less than the amount of disentangled-UHMWPE.

2. The polymeric gel as claimed in claim 1, wherein said nucleator is at least one selected from the group consisting of di(3,4-dimethylbenzylidene)sorbitol, 2,2'-Methylene-bis-(4,6-di-tert-butylphenyl)phosphate Sodium salt (NA11) and aluminum hydroxy bis(2,2'-methylenebis[4,6-di(tert-butyl)phenyl]phosphate (NA21).

3. The polymeric gel as claimed in claim 1, wherein said filler is at least one selected from the group consisting of montmorillonite modified with a quaternary ammonium salt and calcium stearate.

4. The polymeric gel as claimed in claim 1, wherein said fluid medium is at least one selected from the group consisting of aliphatic hydrocarbons, acyclic hydrocarbons, cyclic hydrocarbons, aromatics hydrocarbons and halogenated hydrocarbons.

5. The polymeric gel as claimed in claim 1, wherein said fluid medium is at least one selected from the group consisting of cis-decahydronaphthalene, trans-decahydronaphthalene, decalin, paraffin oil and dichlorobenzene.

6. The polymeric gel as claimed in claim 1, further includes at least one antioxidant in an amount ranging from 0.25 to 5.0% with respect to the total mass of the gel.

7. The polymeric gel as claimed in claim 6, wherein said antioxidant is at least one selected from the group consisting of tris(2,4-ditert-butylphenyl) phosphite and pentaerythritol Tetrakis(3-(3,5-di-tert-butyl-4-hydroxyphenyl) propionate) and when two antioxidants are used, the ratio of a first antioxidant to a second antioxidant ranges between 1:1 and 1:2.

8. The polymeric gel as claimed in claim 1, further includes at least one modifier in an amount ranging from 0.25 to 1.5% with respect to the total mass of the gel.

9. The polymeric gel as claimed in claim 8, wherein said modifier is calcium stearate.

10. A process for the preparation of said a compact polymeric gel as claim in claim 1; said process comprising the following steps:
    i. admixing said UHMWPE in the amount ranging from 2 to 40% with respect to the total mass of the gel, said at least one nucleator in the amount ranging from 0.05 to 4.0% with respect to the total mass of the gel, said at least one filler in the amount ranging from 0.1 to 1.5% with respect to the total mass of the gel, optionally at least one antioxidant in an amount ranging from 0.25 to 5.0% with respect to the total mass of the gel and optionally, at least one modifier in an amount ranging from 0.25 to 1.5% with respect to the total mass of the gel to obtain a first admixture;
    ii. incorporating said first admixture in said fluid medium to obtain a second admixture;
    iii. heating said second admixture at a temperature ranging from 50 to 200° C. for a time period ranging from 2 to 20 hours under inert conditions to obtain said compact polymeric gel composition;
    iv. cooling said polymeric gel composition to obtain said cooled polymeric gel composition; and
    v. removing the excess fluid medium from the polymeric gel composition to obtain the compact polymeric gel;
    wherein said UHMWPE is disentangled-UHMWPE or is a combination of entangled-UHMWPE and disentangled-UHMWPE such that the amount of entangled-UHMWPE is equal to or less than the amount of disentangled-UHMWPE.

11. The process as claimed in claim 10, further includes a step of recycling the removed excess fluid medium.

12. A process for preparation of fibers comprising:
    i. spinning the compact polymeric gel obtained by the process as claimed in claim 10, at a temperature ranging from 120 to 200° C., at a pressure ranging from 2 to 3 kg/cm$^2$ to obtain spun fibers;
    ii. extruding said spun fibers at a pre-determined temperature profile to obtain uniform denier fibers;
    iii. quenching said uniform denier fiber(s) in at least one quenching medium at a temperature ranging from 5° C. to 30° C. to obtain quenched fibers;
    iv. drying said quenched fibers at a temperature ranging from 80° C. to 125° C. to obtain dried fibers; and
    v. hot stretching said dried fibers at a temperature ranging from 90 to 150° C. and at a draw ratio of 5 to 10 to obtain at least two types of fibers having tensile strength ranging from 2.5 to 13 GPa and tensile modulus ranging from 100 to 270 GPa, wherein a first type of fiber is characterized by denier ranging from 0.50 to 10.0 d;
    a second type of fiber is characterized by denier ranging from 3 to 80 d;
    a third type of fiber is characterized by denier ranging from 0.5 to 1.50 d; and
    a fourth type of fiber is characterized by denier ranging from 3 to 39 d.

13. The process as claimed in claim 12, wherein said pre-determined temperature profile is at least one selected from the group consisting of 220° C.-230° C.-250° C., 195° C.-200° C.-210° C., 175° C.-185° C.-190° C. and 145° C.-155° C.-160° C.

14. The process as claimed in claim 12, wherein said quenching medium is water.

15. The process as claimed in claim 12, further includes passing said quenched fibers through a washing bath containing at least one washing medium selected from the group consisting of water, acetone and hexane.

16. The process as claimed in claim 12, wherein said step of hot stretching is multi-stage hot stretching.

17. The process as claimed in claim 12, further includes the step of subjecting said hot stretched fibers to aerial stretching.

18. The process as claimed in claim 10, wherein said fluid medium is at least one selected from the group consisting of dichlorobenze, cis-decahydronaphthalene, trans-decahydronaphthalene, decalin and paraffin oil.

* * * * *